US011490598B2

(12) United States Patent
Belhomme et al.

(10) Patent No.: US 11,490,598 B2
(45) Date of Patent: Nov. 8, 2022

(54) METHOD AND SYSTEM FOR MONITORING ANIMALS

(71) Applicant: INVOXIA, Issy les Moulineaux (FR)

(72) Inventors: Arthur Belhomme, Paris (FR); Éric Humbert, Boulogne Billancourt (FR); Nadine Buard, Meudon (FR); Amélie Caudron, Paris (FR)

(73) Assignee: INVOXIA, Issy les Moulineaux (FR)

( * ) Notice: Subject to any disclaimer, the term of this patent is extended or adjusted under 35 U.S.C. 154(b) by 522 days.

(21) Appl. No.: 16/543,182

(22) Filed: Aug. 16, 2019

(65) Prior Publication Data

US 2020/0068854 A1 Mar. 5, 2020

(30) Foreign Application Priority Data

Aug. 31, 2018 (EP) .................................... 18306154

(51) Int. Cl.
*A01K 29/00* (2006.01)
*G01S 19/13* (2010.01)
*G01S 1/68* (2006.01)
*A01K 55/00* (2006.01)
*A01K 11/00* (2006.01)
*G06N 3/08* (2006.01)
*G01K 1/14* (2021.01)
*H04L 67/12* (2022.01)

(52) U.S. Cl.
CPC .......... *A01K 29/005* (2013.01); *A01K 11/008* (2013.01); *A01K 55/00* (2013.01); *G01K 1/14* (2013.01); *G01S 1/68* (2013.01); *G01S 19/13* (2013.01); *G06N 3/08* (2013.01); *H04L 67/12* (2013.01)

(58) Field of Classification Search
CPC ... A01K 15/027; A01K 29/005; A01K 11/006
USPC ....................... 340/511, 573.1; 600/301, 300
See application file for complete search history.

(56) References Cited

U.S. PATENT DOCUMENTS 8,398,538 B2 3/2013 Dothie et al.
2002/0010390 A1* 1/2002 Guice .................... G16H 50/20
600/300

(Continued)

FOREIGN PATENT DOCUMENTS

WO WO 2013/170298 A1 11/2013
WO WO 2016/025517 A1 2/2016

(Continued)

OTHER PUBLICATIONS

European Search Report Application No. 18306154.8 reported on Mar. 7, 2019.

*Primary Examiner* — Kiet M Doan
(74) *Attorney, Agent, or Firm* — von Briesen & Roper, s.c.

(57) ABSTRACT

A method for monitoring an animal with an autonomous monitoring device in close proximity to the animal, the monitoring device having a first sensor and a second sensor of higher electric power consumption. The method includes measuring a first parameter with the first sensor, the second sensor being deactivated. An estimated status of the animal is determined based on the first parameter. If the estimated status corresponds to a particular status, the second sensor is activated and measures a second parameter which is used to determine a specified estimated status of the animal.

14 Claims, 4 Drawing Sheets

(56) References Cited

U.S. PATENT DOCUMENTS

| | | | |
|---|---|---|---|
| 2007/0130893 A1* | 6/2007 | Davies | A61B 5/1123 54/1 |
| 2008/0204240 A1* | 8/2008 | Hilgers | G01D 21/00 340/572.1 |
| 2010/0198023 A1 | 8/2010 | Yanai et al. | |
| 2011/0061605 A1 | 3/2011 | Hardi et al. | |
| 2015/0039239 A1* | 2/2015 | Shuler | G16H 40/67 702/19 |
| 2016/0174099 A1 | 6/2016 | Goldfain | |
| 2017/0079247 A1 | 3/2017 | Womble et al. | |
| 2017/0095206 A1* | 4/2017 | Leib | A01K 27/009 |
| 2017/0196196 A1 | 7/2017 | Trottier | |
| 2017/0373899 A1* | 12/2017 | Sato | H04W 4/02 |
| 2019/0220697 A1* | 7/2019 | Kiemele | G06V 40/20 |

FOREIGN PATENT DOCUMENTS

| | | |
|---|---|---|
| WO | WO 2016/100296 A1 | 6/2016 |
| WO | WO 2016/138571 A1 | 9/2016 |
| WO | WO 2018/147654 A1 | 8/2018 |

* cited by examiner

METHOD AND SYSTEM FOR MONITORING ANIMALS

CROSS-REFERENCE TO RELATED APPLICATION

This application claims priority under the Paris Convention to European Patent Application No. 18306154.8 filed on Aug. 31, 2018.

FIELD OF THE DISCLOSURE

The present disclosure relates to methods and systems for monitoring animals.

BACKGROUND OF THE DISCLOSURE

WO2016/025517A1 discloses systems and methods for providing animal information related to at least one animal which may sense, with at least one sensor of at least one device on the animal or in the animal's environment, information related to the animal. At least one device processor may automatically transform the sensed information into descriptive information describing a condition of the animal or related to the animal. The at least one device processor and/or at least one remote processor in communication with the at least one device processor may compare the descriptive information to known information relevant to the condition. The at least one device processor and/or at least one mobile device in communication with the at least one device processor may report information about the animal utilizing the descriptive information and the database information. The at least one device processor and/or the at least one remote processor may also generate a personalized recommendation related to the animal using the descriptive information and at least one of the known information and information related to the animal provided by a user.

SUMMARY OF THE DISCLOSURE

One object of the present disclosure is to propose a method for monitoring animals which enables fine monitoring of animals with an autonomous monitoring device having low energy consumption.

To this end, the present disclosure proposes a method for monitoring at least one animal with an autonomous monitoring device being in close proximity to the animal, said monitoring device having at least a processor, a first sensor communicating with the processor and having a first electric power consumption, a second sensor communicating with the processor and having a second electric power consumption, said first electric power consumption being lower than the second electric power consumption, and a battery feeding at least said processor, first sensor and second sensor, said method including:
  measuring a first parameter with the first sensor while the second sensor is deactivated,
  determining an estimated status of the animal based on the first parameter,
  if said estimated status corresponds to at least one predetermined status, activating the second sensor and measuring a second parameter with said second sensor,
  determining a specified estimated status of the animal based on the second parameter.

Thanks to these dispositions, fine monitoring of the animal is achieved due to cross-determination by the first and second sensors, without impairing the autonomy of the monitoring device since only the low consumption first sensor is activated permanently.

In embodiments of the above method, one may further use one or several of the following features and any combination thereof:
  said monitoring device is worn by the animal, said first sensor is an accelerometer and said first parameter is acceleration;
  said second sensor is a microphone and said second parameter is sound;
  said animal is a dog, said predetermined status is "barking", said second sensor is a microphone, said second parameter is sound and said specified estimated status reflects a psychological state of the animal corresponding to a type of barking;
  said animal is hosted in a building and has a possibility to move out of the building, said predetermined status is "moving substantively", said second sensor is chosen in the group comprising:
    a satellite geolocation receptor, in which case the second parameter is a number of satellites from which the receptor receives signal, and
    a short range radio interface, in which case the second parameter is a connectivity with at least one radio short range router having a known position relative to said building,
  and said specified estimated status is chosen between "out of the building" and "inside the building";
  said second sensor is said short range radio interface and said at least one radio short range router is inside the building;
  said first sensor is a temperature sensor and said first parameter is temperature;
  said first sensor is either a temperature sensor and said first parameter is temperature, or an accelerometer and said first parameter is acceleration; said at least one animal includes a plurality of bees and said first sensor is inside a hive hosting said plurality of bees, said second sensor is a microphone, said second parameter is noise, said predetermined status is either "high temperature" if the first sensor is the temperature sensor or "agitation" if the first sensor is the accelerometer; and said specified estimated status is a degree of stress of said plurality of bees;
  determining said estimated status and determining said specified estimated status are done by an artificial intelligence trained therefor;
  said artificial intelligence includes a neural network;
  at least said estimated status of the animal and said specified estimated status of the animal are transmitted to a user by telecommunication.

Another object of the present disclosure is a system for monitoring at least one animal, said system including an autonomous monitoring device adapted to be in close proximity to the animal, said monitoring device having at least a processor, a first sensor communicating with the processor and having a first electric power consumption, a second sensor communicating with the processor and having a second electric power consumption,
said first electric power consumption being lower than the second electric power consumption, and a battery feeding at least said processor, first sensor and second sensor,
said processor being configured to activate and deactivate the second sensor,
said processor being configured to measure a first parameter with the first sensor while maintaining the second sensor deactivated, said system being configured to determine an estimated status of the animal based on the first parameter,
said processor being configured to, if said estimated status corresponds to at least one predetermined status, activate the second sensor and measure a second parameter with said second sensor,
and said system being configured to determine a specified estimated status of the animal based on the second parameter.

In embodiments of the above system, one may further use one or several of the following features and any combination thereof:
- said processor is configured to determine said estimated status and said specified estimated status;
- the system further comprises at least one distant server, said processor communicates with at least one distant server and said at least one distant server is configured to determine said estimated status and said specified estimated status;
- the system includes an artificial intelligence trained for determining said estimated status and for determining said specified estimated status;
- said artificial intelligence includes a neural network which is either embedded in said processor, or run on at least one distant server communicating with said processor;
- said monitoring device is adapted to be worn by the animal, said first sensor is an accelerometer and said first parameter is acceleration;
- said second sensor is a microphone and said second parameter is sound;
- said animal is a dog, said predetermined status is "barking", said second sensor is a microphone, said second parameter is sound and said specified estimated status reflects a psychological state of the animal corresponding to a way of barking;
- said animal is hosted in a building and has a possibility to move out of the building, said predetermined status is "moving substantively", said second sensor is chosen in the group comprising:
  - a satellite geolocation receptor, in which case the second parameter is a number of satellites from which the receptor receives signal, and
  - a short range radio interface, in which case the second parameter is a connectivity with at least one radio short range router having a known position relative to said building,
and said specified estimated status is chosen between "out of the building" and "inside the building";
- said second sensor is said short range radio interface and said at least one radio short range router is inside the building;
- said first sensor is a temperature sensor and said first parameter is temperature;
- said first sensor is either a temperature sensor and said first parameter is temperature, or an accelerometer and said first parameter is acceleration; said at least one animal includes a plurality of bees and said first sensor is inside a hive to which belongs said plurality of bees, said second sensor is a microphone, said second parameter is noise, said predetermined status is either "high temperature" if the first sensor is the temperature sensor or "agitation" if the first sensor is the accelerometer and said specified estimated status is a degree of stress of said plurality of bees;
- said system further includes a mobile communication device in possession of a user and said system is adapted to transmit at least said estimated status of the animal and said specified estimated status of the animal to the mobile communication device by telecommunication.

BRIEF DESCRIPTION OF THE DRAWINGS

Other features and advantages will appear from the following description of three embodiments, given by way of non-limiting examples, with regard to the drawings.

In the drawings.

DETAILED DESCRIPTION

In the various drawings, the same references designate identical or similar elements.

Figure 1:
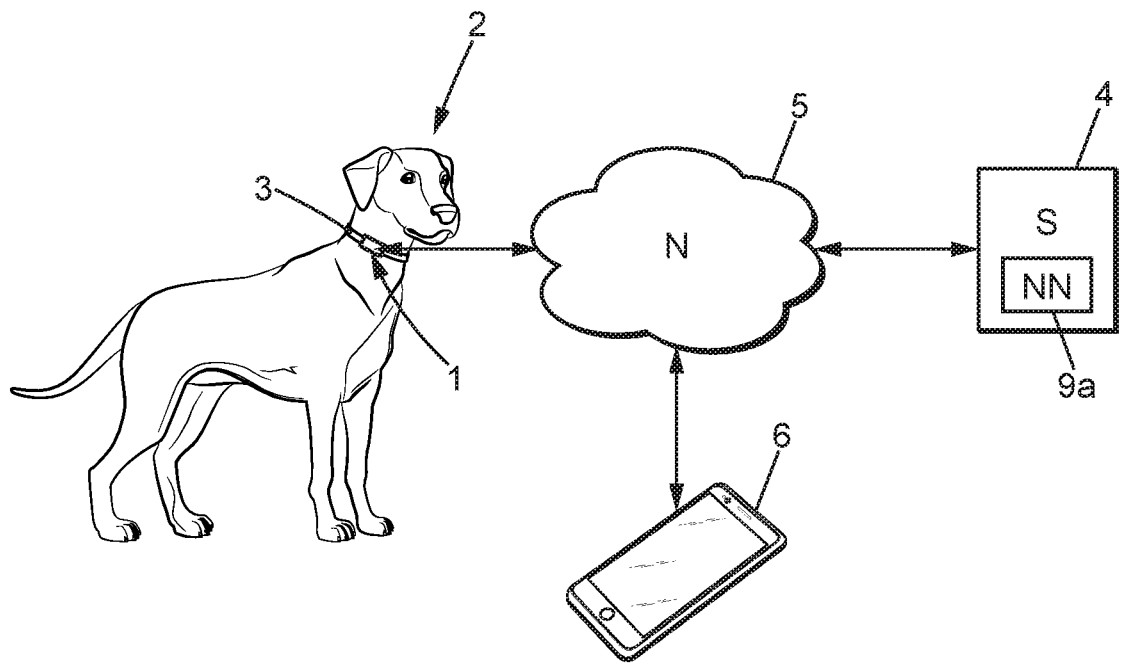
FIG. 1 shows an example of system for monitoring at least one animal.

FIG. 1 illustrates a system according to a first embodiment of the present disclosure for monitoring at least one animal 2.

The animal 2 shown on FIG. 1 is a dog, but the disclosure is not limited to use of the system with dogs. On the contrary, the disclosure is applicable to animals in general, although some embodiments of the disclosure may be specifically intended for dogs.

The system of FIG. 1 includes an autonomous monitoring device 1 being in close proximity to the animal 2. When the animal 2 is big enough, the monitoring device 1 may be worn by the animal 2. For instance, the animal 2 may have a collar 3 around its neck and the monitoring device 1 may be attached to said collar 3. Similarly, the monitoring device 1 may be attached to a harness or similar worn by the animal 2.

The monitoring device 1 may communicate through a network 5 (N) with a server 4 (S), and the server 4 may communicate with a mobile device 6 such as a smartphone or similar of a user, through the network 5 or through another network 5.

Alternatively, the monitoring device 1 may communicate directly with the mobile device 6 through the network 5. In this case, the server 4 might in some cases be omitted.

The network 5 may be any known network, for instance the network 5 may be or include a WAN such as the internet. Access to the network 5 may be done in any known way, for instance by radio communication using 2G, 3G, 4G or 5G protocol, or by a wired communication, or by a LAN (for instance a radio LAN using Wi-Fi, Bluetooth®, LORA®, SigFox® or NBIoT protocol) combined with one of a radio communication using 2G, 3G, 4G or 5G protocol and a wired communication. Typically, the monitoring device 1 may communicate with the network 5 using a radio LPWAN (Low Power Wide Area Network) connection such as for instance LORA®, SigFox® or NBIoT, the at least one server 4 may communicate with the network 5 by wired connection and the mobile 6 may communicate with the network 5 by a 2G, 3G, 4G or 5G connection and/or by a WIFI connection.

Figure 2:
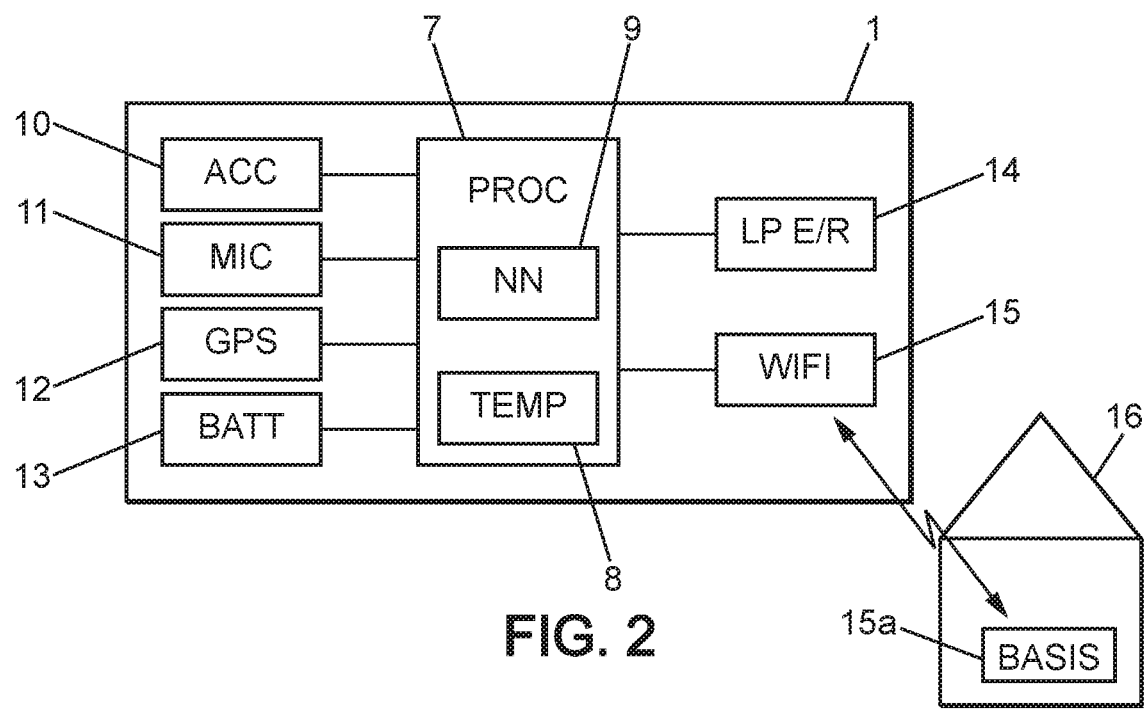
FIG. 2 is a block diagram part of the system of FIG. 1.

As shown in FIG. 2, the monitoring device 1 may have:
- at least a processor 7 (PROC);
- several sensors communicating with the processor 7 and/or embedded in the processor 7, including at least a first sensor having a first electric power consumption and a second sensor having a second electric power consumption, said first electric power consumption being lower than the second electric power consumption; and
- a battery 13 (BATT) feeding at least said processor, first sensor and second sensor.

The monitoring device 1 may further include at least one telecommunication interface 14-15 communicating with the processor 7, for instance a radio LPWAN (Low Power Wide Area Network) interface 14 (LP E/R) and a radio LAN (Local Area Network) interface 15 (WIFI). The LPWAN interface 14 may be for instance a LORA®, SigFox® or NBIoT interface, and the LAN interface 15 may be for instance a WIFI interface or a BLUETOOTH® interface. The LAN interface may communicate with a router or gateway 15a, which may for instance be located inside a building 16 in which the animal is normally hosted.

In the particular embodiment of FIG. 2, the above mentioned sensors may include:
- a temperature sensor 8 (TEMP) which may be embedded in the processor 7 (in variant, the temperature sensor 8 may be separate from the processor 7 and communicate with said processor 7);
- an accelerometer 10 (ACC);
- a microphone 11 (MIC);
- a satellite geolocation receptor 12 (GPS), for instance a GPS receptor;
- and possibly the radio LAN interface 15 which may in some cases be used as a sensor as will be explained below.

The monitoring device 1 may include more sensors than the above, and some of the above sensors may be omitted in some embodiments.

The system may use an artificial intelligence to interpret data from the sensors. Such artificial intelligence may be in the form of a neural network 9, 9a (NN). Such neural network 9 may be embedded in and run on the processor 7 as shown in FIG. 2. Alternatively, the neural network 9a may be run on the at least one server 4 (FIG. 1).

When operating the system, the processor 7 is configured to have a first parameter measured by the first sensor (hence with low power consumption) while the second sensor is deactivated. An estimated status of the animal is then determined by the system (more particularly, by the processor 7 or the server 4) based on the first parameter. The estimated status may be determined by the artificial intelligence of the system, which is trained in this purpose. More particularly, the estimated status may be determined locally on the processor 7 by the neural network 9 and/or at the server 4 by the neural network 9a. The estimated status may be sent to the user on his or her mobile device 6.

If said estimated status corresponds to at least one predetermined status, the processor 7 is configured to activate the second sensor and to measure a second parameter with said second sensor. Such activation may be either automatic and based on the estimated status, or triggered by the user from the mobile device 6.

A specified estimated status of the animal is then determined by the system (more particularly, by the processor 7 or the server 4) based on the second parameter, to more precisely determine the situation of the animal 2. The specified estimated status may be sent to the user on his or her mobile device 6. The specified estimated status may be determined by the artificial intelligence of the system, which is trained in this purpose. More particularly, the specified estimated status may be determined locally on the processor 7 by the neural network 9 and/or at the server 4 by the neural network 9a.

Three examples of use of the monitoring device 1 will now be described.

Figure 3:
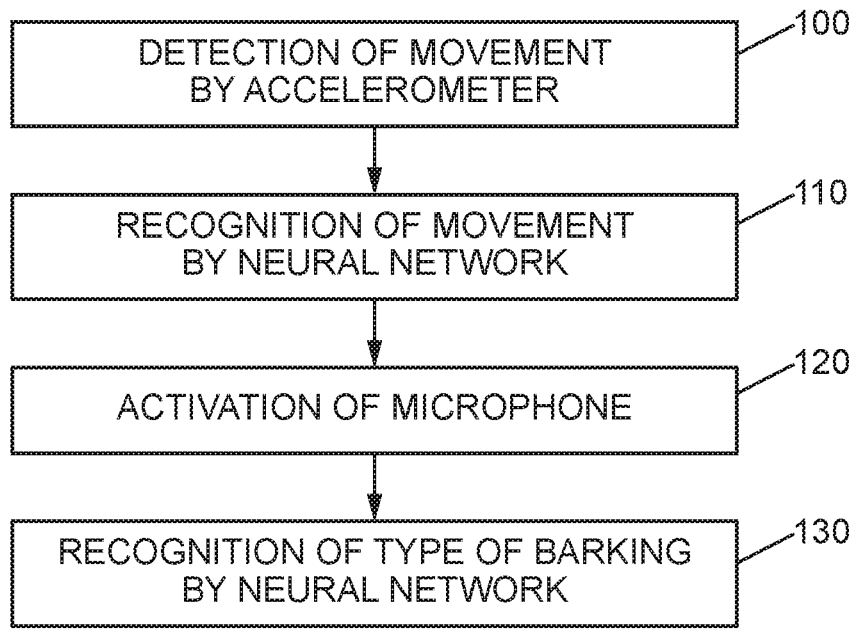
FIG. 3 is a flow diagram illustrating one way of operation of the system of FIG. 2.

In a first example, as illustrated on FIG. 3, the first sensor may be the accelerometer 10 and the second sensor may be the microphone 11. The first parameter is thus acceleration and the second parameter is sound captured by the microphone 11. This first example may be suited in particular when the animal 2 is a dog and wears the monitoring device 1.

At step 100, the processor 7 detects movement by the accelerometer 10. This step 100 may be implemented continuously or very frequently without limiting the autonomy of the monitoring device 1, since the accelerometer consumes extremely low electric power. At step 100, the microphone 11 and other power-consuming sensors of the monitoring device 1 are off.

At step 110, the movement or activity of the dog may be recognized by the neural network 9 or 9a, which thus gives an estimated status of the animal 2. For instance, in the case of a dog, the recognized movement or activity may be comprised in a number of predetermined statuses:
- runs;
- jumps;
- walks;
- does not move;
- pants;
- eats;
- drinks;
- scratches itself;
- barks.

For instance, if the estimated status is "barks", at step 120 the processor 7 may activate the microphone 11 for some time and record the sound captures by the microphone 11.

At step 130, the sound may be recognized by the neural network 9 or 9a, which thus gives a specified estimated status of the animal 2. For instance, the specified estimated status may be "aggressive barking" "non-aggressive barking". More generally, the specified estimated status may reflect a psychological state of the animal corresponding to a type of barking or reflect the type of situation where the dog is (for instance, fight with another animal, fear or aggressivity due to an intrusion in the area where the dog is, etc.).

Similar steps may be performed with other animals than dogs, except that the predetermined status triggering step 130 will not be "barks" and the specified estimated status is not connected to barking but still may reflect a psychological state of the animal corresponding to the recorded sound or reflect the type of situation where the dog is based on the recorded sound.

In particular, steps 100-130 are also usable for a cat instead of a dog. In the case of a cat, at step 110, the recognized movement or activity may be comprised in a number of predetermined statuses:
- runs;
- jumps;
- walks;
- does not move;
- grooms itself;

eats;
drinks.

Figure 4:
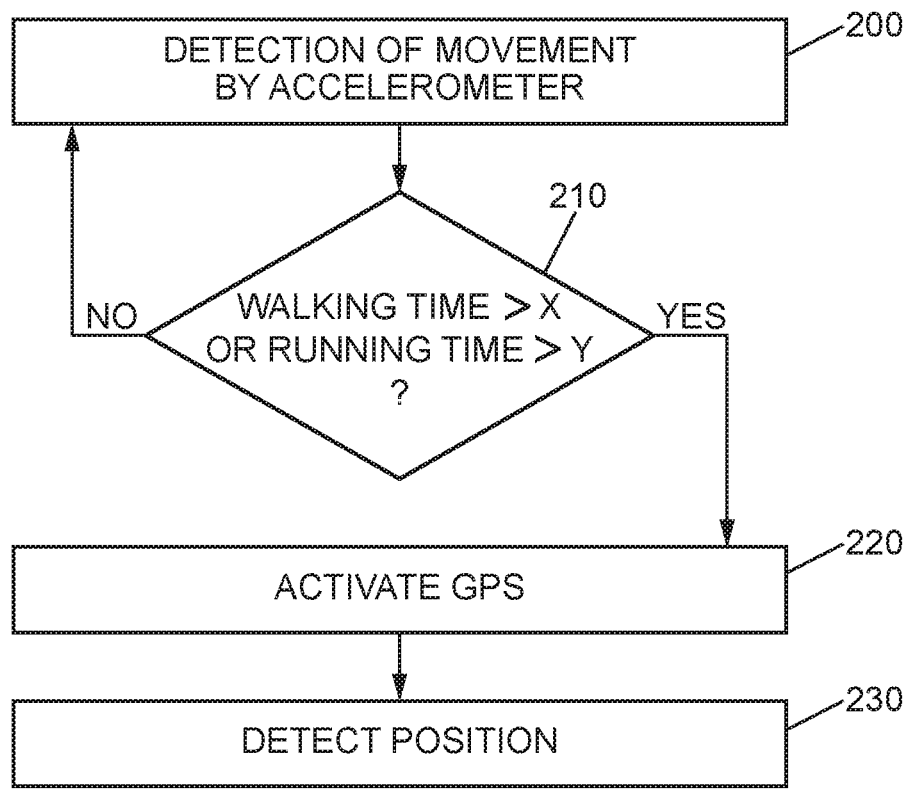
FIG. 4 is a flow diagram illustrating another way of operation of the system of FIG. 2.
Figure 5:
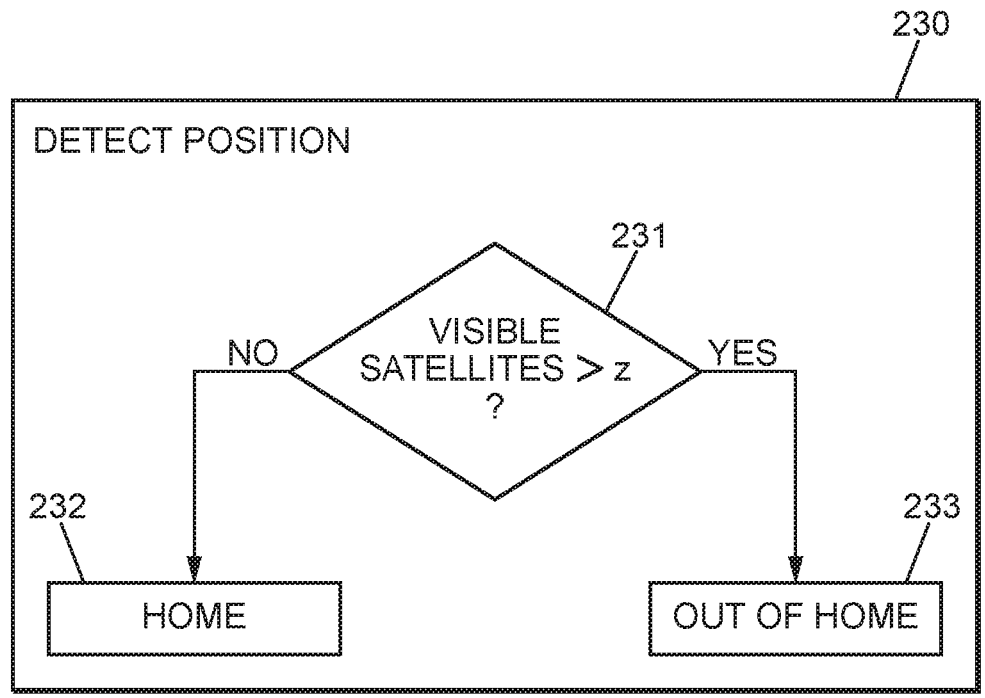
FIG. 5 shows details of block 230 of the flow diagram of FIG. 4.

In a second example, as illustrated in FIGS. 4-5, the first sensor may be the accelerometer 10 and the second sensor may be the satellite geolocation receptor 12. The first parameter is thus acceleration and second parameter may be a number of satellites "seen" by the satellite geolocation receptor 12.

At step 200, the processor 7 detects movement of the animal 2 by the accelerometer 10. The estimated status of the animal is then "moving".

At step 210, the processor 7 determines the time T of movement of the animal 2 and whether it is walking or running, based on the measures given by the accelerometer 10.

In case the animal 2 is walking and the walking time is longer than X mn, or in case the animal is running and the running time is larger than Y mn (Y being less than X), then the estimated status of the animal is set to "moving substantively" by the processor 7. The processor 7 then activates the satellite geolocation receptor 12 at step 220 and detects the position of the animal at step 230.

In a variant, at step 210, the estimated status of the animal may be set to "moving substantively" by the processor 7 if: (the animal 2 is walking and the walking time is longer than X mn, or the animal is running and the running time is larger than Y mn) and (the animal is moving substantially according to a main direction). The condition "the animal is moving substantially according to a main direction" represents the fact that the animal is aiming somewhere and is not doing random movements. This condition may be detected by neural network 9 or 9a.

In a particular case, as illustrated on FIG. 5, at step 230, the processor 7 determines the number of satellites "seen" by the satellite geolocation receptor 12 (step 231) and determines whether the animal is inside a home 16 (or any other building 16) or outside the home 16 by said number of satellites: if this number is more than a predetermined threshold z (for instance 1 or 2), the animal is out of home or more generally outside the building 16 (step 233), otherwise it is at home or more generally inside the building 16 (step 232). The specified estimated status is thus either "out of the building" or "inside the building". The estimated status and specified estimated status are transmitted to the user on his or her mobile device 6.

In the method of FIG. 4, at step 220, the processor may activate the short range radio LAN interface 15, for instance a WIFI interface, which is then used as second sensor. In that case, at step 230, the processor 7 determines the second parameter which is a connectivity with at least one radio short range router 15a having a known position relative to said building 16 (for instance inside the building 16). Such connectivity enables the processor to determine the specified estimated status which is chosen between "out of the building" and "inside the building".

In a third example, the first sensor may be the temperature sensor 8 and said first parameter is temperature.

Figure 6:
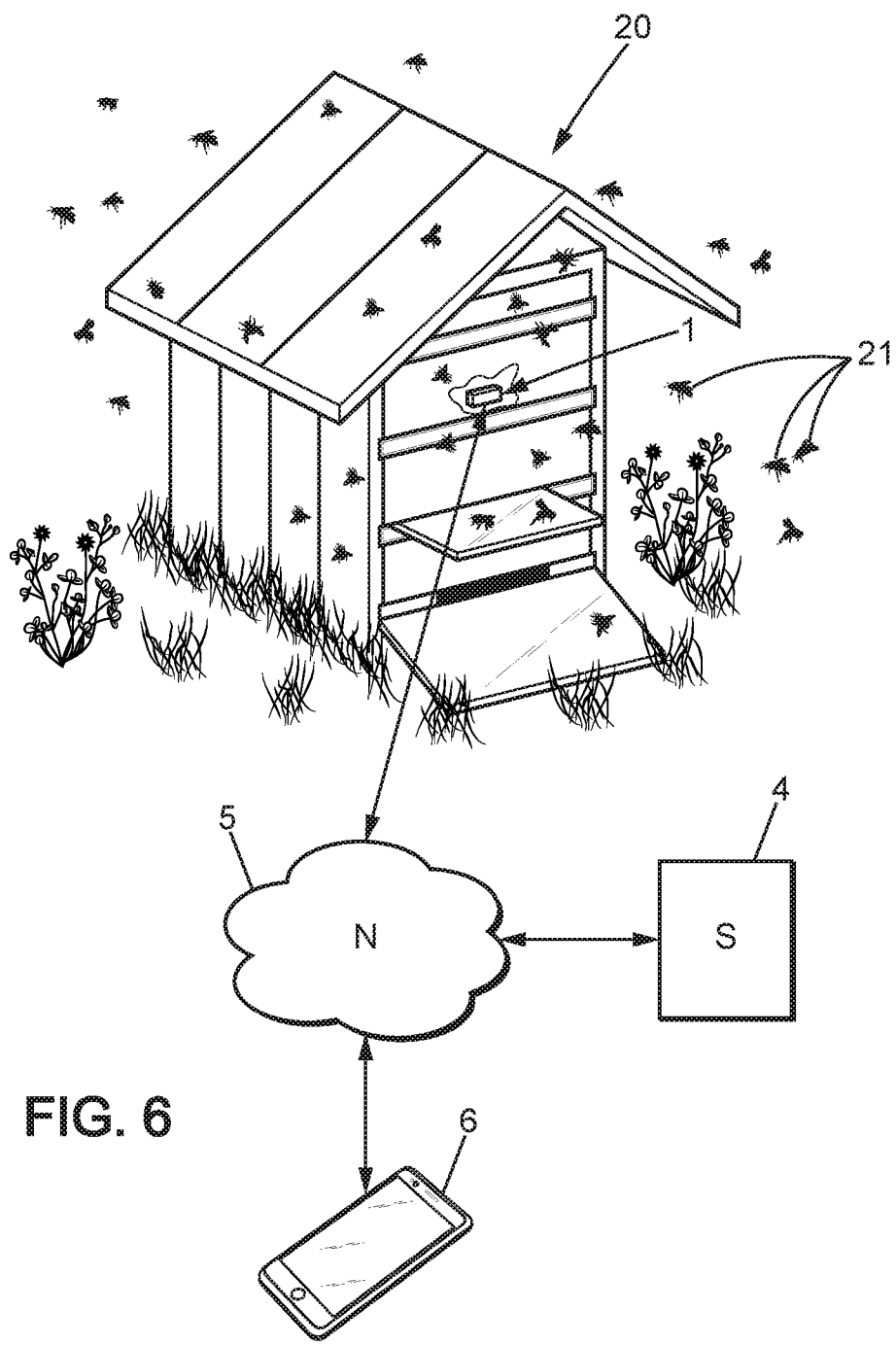
FIG. 6 shows another example of system for monitoring at least one animal.

This third example may be used for instance when said at least one animal includes a plurality of bees 21 (FIG. 6) and said temperature sensor 8 is inside a hive 20 to which belongs said plurality of bees. Preferably the whole monitoring device 1 may be located inside the hive 20.

In this third example, said second sensor is the microphone 11 and said second parameter is sound registered by the processor 7 from microphone 11.

Figure 7:
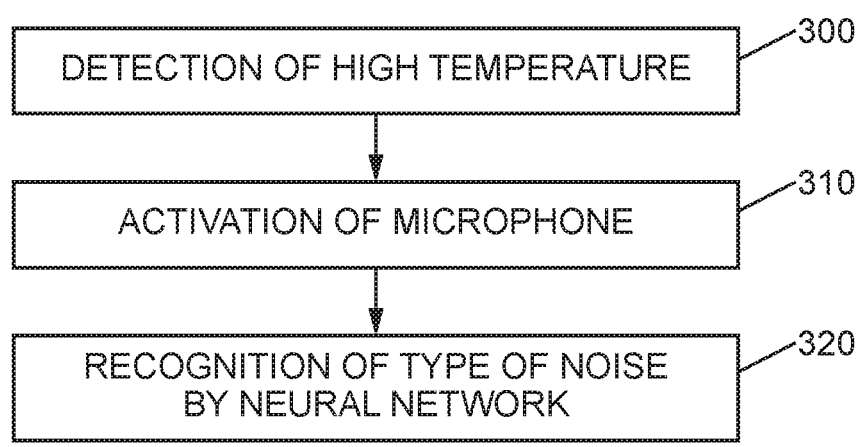
FIG. 7 is a flow diagram illustrating one way of operation of the system of FIG. 6.

As illustrated at FIG. 7, at step 300, the processor 7 detects when temperature rises above a predetermined threshold (estimated status "high temperature"), indicating a possible stress of the bees 21 inside the hive 20.

At step 310, the processor 7 then activates the microphone 11 and records sound captured by the microphone 11.

At step 320, such sound is recognized by the system, in particular by the neural network 9 or 9a which is trained in this purpose, in particular to determine whether the hive 20 is being attacked by Asian hornets or other predator (specified estimated status "attack of hive").

In all cases where the second sensor is the microphone 11, the analysis of the sound may be carried out either on a raw sound capture, or on a spectrogram thereof.

In a variant of the third example, the first sensor may be the accelerometer 10 and said first parameter is acceleration, while the second sensor is still the microphone 11 and said second parameter is sound registered by the processor 7 from microphone 11.

This variant may be used in the same conditions as the above third example, when said at least one animal includes a plurality of bees 21. The accelerometer 10 is then used to detect agitation of the bees (estimated status "agitated") instead of step 300 of FIG. 7.

In this variant, said second sensor is still the microphone 11 and said second parameter is sound registered by the processor 7, indicating a possible stress of the bees 21 inside the hive 20 (steps 310 and 320 of FIG. 7 remain the same as explained before).

The invention claimed is:

1. A method for monitoring at least one animal with an autonomous monitoring device being in close proximity to the animal, said monitoring device having at least:
    a processor;
    a first sensor communicating with the processor and having a first electric power consumption;
    a second sensor communicating with the processor and having a second electric power consumption, said first electric power consumption being lower than the second electric power consumption; and
    a battery feeding at least said processor, first sensor and second sensor; said method including:
    measuring a first parameter with the first sensor while the second sensor is deactivated,
    determining an estimated status of the animal based on the first parameter,
    if said estimated status corresponds to at least one predetermined status, activating the second sensor and measuring a second parameter with said second sensor,
    determining a specified estimated status of the animal based on the second parameter;
    wherein said monitoring device is worn by the animal, said first sensor is an accelerometer and said first parameter is acceleration; and
    wherein said animal is a dog, said predetermined status is "barking", said second sensor is a microphone, said second parameter is sound and said specified estimated status reflects a psychological state of the animal corresponding to a type of barking.

2. The method of claim 1, wherein:
    said animal is hosted in a building and has a possibility to move out of the building;
    said predetermined status is "moving substantively";
    said second sensor is chosen in the group comprising:
        a satellite geolocation receptor, in which case the second parameter is a number of satellites from which the receptor receives signal; and a short range radio interface, in which case the second parameter is a connectivity with at least one radio short range router having a known position relative to said building;

and said specified estimated status is chosen between "out of the building" and "inside the building".

3. The method of claim 2, wherein said second sensor is said short range radio interface and said at least one radio short range router is inside the building.

4. The method of claim 1, wherein said first sensor is a temperature sensor and said first parameter is temperature.

5. A method for monitoring at least one animal with an autonomous monitoring device being in close proximity to the animal, said monitoring device having at least:
  a processor;
  a first sensor communicating with the processor and having a first electric power consumption;
  a second sensor communicating with the processor and having a second electric power consumption, said first electric power consumption being lower than the second electric power consumption; and
  a battery feeding at least said processor, first sensor and second sensor; said method including:
    measuring a first parameter with the first sensor while the second sensor is deactivated,
    determining an estimated status of the animal based on the first parameter,
    if said estimated status corresponds to at least one predetermined status, activating the second sensor and measuring a second parameter with said second sensor,
    determining a specified estimated status of the animal based on the second parameter, wherein
  said monitoring device is worn by the animal, said first sensor is an accelerometer and said first parameter is acceleration:
  said animal is hosted in a building and has a possibility to move out of the building;
  said predetermined status is "moving substantively";
  said second sensor is chosen in the group comprising:
    a satelite geolocation receptor, in which case the second parameter is a connectivity with at least one radio short range router having a known position relative to said building;
  and said specified estimated status is chosen between "out of the building" and "inside building".

6. The method of claim 1, wherein determining said estimated status and determining said specified estimated status are done by an artificial intelligence trained therefor.

7. A method for monitoring at least one animal with an autonomous monitoring device being in close proximity to the animal, said monitoring device having at least:
  a processor;
  a first sensor communicating with the processor and having a first electric power consumption;
  a second sensor communicating with the processor and having a second electric power consumption, said first electric power consumption being lower than the second electric power consumption; and
  a battery feeding at least said processor, first sensor and second sensor; said method including:
    measuring a first parameter with the first sensor while the second sensor is deactivated,
    determining an estimated status of the animal based on the first parameter,
    if said estimated status corresponds to at least one predetermined status, activating the second sensor and measuring a second parameter with said second sensor,
    determining a specified estimated status of the animal based on the second parameter,
  wherein said first sensor is a temperature sensor and said first parameter is temperature.

8. A method for monitoring at least one animal with an autonomous monitoring device being in close proximity to the animal, said monitoring device having at least:
  a processor;
  a first sensor communicating with the processor and having a first electric power consumption;
  a second sensor communicating with the processor and having a second electric power consumption, said first electric power consumption being lower than the second electric power consumption; and
  a battery feeding at least said processor, first sensor and second sensor; said method including:
    measuring a first parameter with the first sensor while the second sensor is deactivated,
    determining an estimated status of the animal based on the first parameter,
    if said estimated status corresponds to at least one predetermined status, activating the second sensor and measuring a second parameter with said second sensor,
    determining a specified estimated status of the animal based on the second parameter,
  wherein:
  said first sensor is either a temperature sensor and said first parameter is temperature, or an accelerometer and said first parameter is acceleration;
  said at least one animal includes a plurality of bees and said first sensor is inside a hive hosting said plurality of bees;
  said second sensor is a microphone;
  said seeond parameter is noise;
  said predetermined status is either "high temperature" if the first sensor is the temperature sensor, or "agitation" if the first sensor is the accelerometer; and
  said specified estimated status is a degree of stress of said plurality of bees.

9. A system for monitoring at least one animal, said system including an autonomous monitoring device adapted to be in close proximity to the animal, said monitoring device having at least:
  a processor;
  a first sensor communicating with the processor and having a first electric power consumption;
  a second sensor communicating with the processor and having a second electric power consumption, said first electric power consumption being lower than the second electric power consumption; and
  a battery feeding at least said processor, first sensor and second sensor; said processor being configured to activate and deactivate the second sensor, said processor being configured to measure a first parameter with the first sensor while maintaining the second sensor deactivated,
  said system being configured to determine an estimated status of the animal based on the first parameter,
  said processor being configured to, if said estimated status corresponds to at least one predetermined status, activate the second sensor and measure a second parameter with said second sensor, and said system being configured to determine a specified estimated status of the animal based on the second parameter;
wherein said monitoring device is worn by the animal, said first sensor is an accelerometer and said first parameter is acceleration; and
wherein said animalis a dog, said predetermined status is "barking", said second sensor is a microphone, said second parameter is sound and said specified estimated status reflects a psychological state of the animal corresponding to a type of barking.

10. The system of claim 9, wherein said processor is configured to determine said estimated status and said specified estimated status.

11. The system of claim 9 further comprising at least one distant server, wherein said processor communicates with said at least one distant server and said at least one distant server is configured to determine said estimated status and said specified estimated status.

12. The system of claim 9, including an artificial intelligence trained for determining said estimated status and for determining said specified estimated status.

13. The system of claim 12, wherein said artificial intelligence includes a neural network which is either embedded in said processor, or run on at least one distant server communicating with said processor.

14. A method for monitoring at least one animal with an autonomous monitoring device being in close proximity to the animal, said monitoring device having at least:

a processor;
a first sensor communicating with the processor and having a first electric power consumption;
a second sensor communicating with the processor and having a second electric power consumption, said first electric power consumption being lower than the second electric power consumption; and
a battery feeding at least said processor, first sensor and second sensor; said method including:
  measuring a first parameter with the first sensor while the second sensor is deactivated,
  determining an estimated status of the animal based on the first parameter,
  if said estimated status corresponds to at least one predetermined status, activating the second sensor and measuring a second parameter with said second sensor,
  determining a specified estimated status of the animal based on the second parameter,
wherein said monitoring device is worn by the animal, said first sensor is an accelerometer and said first parameter is acceleration; and
wherein said animal is a cat, said second sensor is a microphone, said second parameter is sound and said specified estimated status reflects a psychological state of the animal.

* * * * *